(12) United States Patent
Dasgupta et al.

(10) Patent No.: US 7,588,862 B2
(45) Date of Patent: Sep. 15, 2009

(54) COMPOSITE POLYMER ELECTROLYTES FOR A RECHARGEABLE LITHIUM BATTERY

(76) Inventors: Sankar Dasgupta, 2645 Royal Windsor Drive, Mississauga, Ontario (CA) L5J 1K9; Rakesh Bhola, 12 Harlton Crescent, Toronto, Ontario (CA) M6M 1L1; James K. Jacobs, 69 Albany Avenue, Toronto, Ontario (CA) M5R 3C2

( * ) Notice: Subject to any disclaimer, the term of this patent is extended or adjusted under 35 U.S.C. 154(b) by 894 days.

(21) Appl. No.: 10/799,759

(22) Filed: Mar. 15, 2004

(65) Prior Publication Data
US 2004/0175626 A1 Sep. 9, 2004

Related U.S. Application Data

(63) Continuation-in-part of application No. 09/104,277, filed on Jun. 25, 1998, now Pat. No. 6,753,114.

(60) Provisional application No. 60/082,341, filed on Apr. 20, 1998.

(51) Int. Cl.
*H01M 10/40* (2006.01)
(52) U.S. Cl. ........................................ 429/309
(58) Field of Classification Search ................ 429/309, 429/144, 307, 317, 316
See application file for complete search history.

(56) References Cited

U.S. PATENT DOCUMENTS

| | | | |
|---|---|---|---|
| 4,650,730 A | 3/1987 | Lundquist et al. | |
| 4,731,304 A | 3/1988 | Lundquist et al. | |
| 5,449,576 A | 9/1995 | Anani | |
| 5,456,000 A | 10/1995 | Gozdz et al. | |
| 5,597,659 A | 1/1997 | Morigaki et al. | |
| 5,620,811 A | 4/1997 | Zhang et al. | |
| 5,643,695 A | 7/1997 | Barker et al. | |
| 5,658,685 A | 8/1997 | Oliver | |
| 5,681,357 A | 10/1997 | Eschbach et al. | |
| 5,688,293 A * | 11/1997 | Oliver et al. | ................ 29/623.1 |
| 5,691,005 A | 11/1997 | Morigaki et al. | |
| 5,716,421 A | 2/1998 | Pendalwar et al. | |
| 5,837,015 A | 11/1998 | Venugopal et al. | |
| 5,853,916 A | 12/1998 | Venugopal et al. | |
| 5,856,039 A | 1/1999 | Takahashi | |

(Continued)

FOREIGN PATENT DOCUMENTS

EP 651455 3/1995

(Continued)

*Primary Examiner*—Patrick Ryan
*Assistant Examiner*—Monique Wills
(74) *Attorney, Agent, or Firm*—H. Samuel Frost; Bereskin & Parr LLP

(57) ABSTRACT

The composite electrolyte for use in a thin plate rechargeable lithium battery comprises a porous or micro-porous inert, multi-layered polymer separator laminate which carries an adherent second polymer coating containing a dissociable lithium compound, and the multi-layered separator having adherent solid second polymer layer, is impregnated with an organic liquid containing another lithium salt. The porous or micro-porous separator laminate is made of multiple polymer layers, at least one of the member layers having melting temperature at least 20-C below the melting temperature of the other polymer member layers. The composite porous electrolyte is inserted between the electrodes of a rechargeable lithium battery. In another embodiment the porous polymer separator sheet has an adherent, dissociable lithium compound containing, solid second polymer layer on each of its major faces.

13 Claims, 6 Drawing Sheets

U.S. PATENT DOCUMENTS

| | | | |
|---|---|---|---|
| 5,858,264 A | 1/1999 | Ichino et al. | |
| 5,952,120 A | 9/1999 | Yu et al. | |
| 6,200,706 B1 * | 3/2001 | Ashida et al. | 429/249 |
| 6,635,384 B2 | 10/2003 | Bahar et al. | |

FOREIGN PATENT DOCUMENTS

| | | |
|---|---|---|
| EP | 798791 | 1/1997 |
| JP | 310581 | 5/1991 |
| JP | 6325747 | 11/1994 |
| WO | WO 9828812 | 2/1998 |
| WO | 1999054953 | 10/1999 |

* cited by examiner

COMPOSITE POLYMER ELECTROLYTES FOR A RECHARGEABLE LITHIUM BATTERY

This application claims the benefit of U.S. Provisional Application No. 60/082,341, filed Apr. 20, 1998, and is a Continuation-in-Part Application of Complete application Ser. No. 09/104,277, filed on Jun. 25, 1998 and a Continued Prosecution Application filed Jun. 12, 2001.

FIELD OF INVENTION

This invention is related to the field of electrochemical cells or electrochemical batteries, more particularly to rechargeable lithium batteries.

BACKGROUND OF THE INVENTION

Most electrochemical cells include a negative electrode, a positive electrode and an electrolyte providing passage for the ionic electro-active species of the electrochemical cell. Electrolytes may be solid or liquid or a composite of both. The electrodes are usually prevented from coming into direct contact by some form of a separator or solid electrolyte, which allows the movement of ionic electro-active species but not of electrons. The separator in some type of batteries provides physical support to the solid electrolyte. Electrochemical cells or batteries are usually equipped with current collectors which can be connected to an external electrical circuit for utilizing the electrical energy generated by the battery. In case of rechargeable electrochemical cells or batteries, the same current collectors serve in the recharging of the battery or cell.

In the last decade or more lithium batteries have been developed for generating electrical energy. Rechargeable lithium batteries may be cylindrical or button shaped and in such forms they often have a non-aqueous liquid electrolyte. More recently, thin plate rechargeable lithium batteries have been developed which are suitable for use in electronic devices of current design, as well as having high energy density per volume or weight. Rechargeable thin plate lithium cells or batteries often utilize as the anode active substance, lithium foil or lithium alloy, or a substance capable of reversibly intercalating lithium ions. The cathode of a rechargeable lithium battery usually contains a transition metal chalcogenide or equivalent, as the positive active material.

The electrolyte of a thin plate rechargeable lithium battery may be a solid electrolyte laminate containing lithium ions, or alternatively, the electrolyte may take the form of a separator sheet in which a non-aqueous solution containing the electro-active component, that is a compound bearing a dissociable lithium ion, is dispersed. Separators for lithium batteries are frequently formed of inert, porous or microporous polymer layers or sheets, which are subsequently impregnated with a liquid electrolyte containing a dissolved lithium salt or similar dissociable lithium bearing substance. The polymer sheet either as a solid electrolyte or as host for a liquid electrolyte, needs to be durable and strong to render effective barrier between the electrodes, as well as to be able to supply sufficiently high concentration of mobile, electro-active species per unit area or unit volume for yielding high current density. It can be seen that the development of suitable electrolytes is a very important aspect of thin film, rechargeable lithium battery technology.

As is known, the role of the electrolyte is to provide ionic communication between the electrodes within the battery. Simultaneously, the separator performs two functions: it maintains a physical and electronic barrier between the electrodes while it provides pathways for the ionic electro-active species for the necessary communication between the electrodes.

Conventional solid, polymer electrolyte compositions incorporate dissociable lithium ion bearing compounds in their structure. The mobility of the electro-active species in the polymer matrix will depend on the nature of the lithium compound having labile lithium ions, as well as on the temperature of the lithium battery operation and such like. It is noted that the mechanical strength of polymers capable of incorporating dissociable lithium ion bearing compounds is often low, and may also be subject to degradation by the electrode materials if the temperature of the battery rises above normal operating temperatures. The lack of mechanical strength may require that solid polymer electrolytes have substantial thickness, which may lead to diminished energy density per unit volume for lithium batteries. The ionic conductivity of lithium ion conducting solid polymer electrolytes is usually in the range of $10^{-4}$ to $10^{-2}$ S/cm.

Hybrid electrolytes for thin plate rechargeable lithium batteries often utilize organic solvents or mixtures thereof for the dissolution of a lithium compound. There are known solvents or mixtures of solvent compounds, such as disclosed, for example, in U.S. Pat. No. 5,643,695 issued to Barker et al. on Jul. 1, 1997. As briefly referred to above, an hybrid lithium battery electrolyte has an inert, porous separator layer for keeping the electrodes separated, and to hold in its pores and micro-pores a large reservoir of dissociable lithium ions for enabling the lithium battery to generate high current density. The lithium battery may be assembled of a negative electrode layer, a positive electrode layer and an inert, plasticised separator layer between the electrodes. The plasticizer may be, at least in part, replaced by an organic lithium ion solution before packaging the battery, as is described in U.S. Pat. No. 5,456,000, issued to Gozdz et al. on Oct. 10, 1995. Inert polymer separators composed of multiple layers of polyolefin membranes of different porosity and melting point, are described in U.S. Pat. No. 4,650,730, issued to Lundquist et al. on Mar. 17, 1987. It is noted that most known separator sheets are inert, in other words, only the electro-active components of the organic solution retained in the cavities and pores of the separator layer take part in the cell reaction. High pore density of the separator sheet may provide a high population of electro-active species but it may also undermine the mechanical strength, and hence the durability of the hybrid electrolyte.

More recently composite, hybrid electrolytes for use in rechargeable lithium batteries have been described, wherein the separator is impregnated and/or coated with an inert gel of organic, long chained, uncured, polymerizable composition, which is capable of absorbing lithium ions or mobile lithium ion bearing compounds. It is noted that in several, conventional lithium electrochemical cell electrolytes the organic, long chained, polymerizable, absorbent composition, which is coating, and/or is adsorbed on the faces, as well as is filling completely the pores of the inert separator, does not contain lithium ions at the time of assembling the electrodes and the coated inert, porous or micro-porous separator. The electrolyte, which is a lithium ion containing organic solution, however, is added at subsequent stages, followed by the polymerisation or curing of the organic, long chained, absorbent polymer coating. Such multi-layered polymer systems are described in U.S. Pat. Nos. 5,658,685, 5,681,357, 5,688,293 and 5,716,421, issued to M. Oliver, Eschbach et al., Oliver et al. and Pendalwar et al, on Aug. 19, 1997, Oct. 28, 1997, Nov. 18, 1997 and Feb. 10, 1998, respectively. In the multi-layered, polymer systems for use in the lithium batteries referred to above, the inert, porous polymer separator is a polyolefin layer, and the polymerizable gel is polyvinylidene fluoride (PVDF) or chemically equivalent polymer or copolymer. The gelling compound of the above publications, is supported by the inert, porous polyolefin layer, and is intended to serve as an inert absorbent for the lithium ion containing organic solution added subsequently. In the methods taught by Eschbach et al., Oliver et al. and Pendalwar et al. the gelling compound is cured and polymerized in the packaged and sealed battery by subjecting the package to heat and pressure, thus bonding the electrodes to the separator bearing the absorbent polymerizable gelling compound. The heat and pressure treatment which is required to solidify/polymerize the gelling compound of the lithium batteries made according to the above methods, may damage the packaging of the lithium battery so produced, thereby rendering the packaging more vulnerable to moisture and similar atmospheric damage. Moreover, the curing of the battery components subsequent to packaging and sealing, may generate undesirable gases and similar compounds detrimental to the satisfactory operation of the lithium battery. It is also noted, that in the above described, conventional multi-component, polymer electrolyte systems containing polymerizable or polymerised gelling compounds, there is only one kind of electro-active lithium species present, which is added to the multi-component, layered electrolyte subsequent to assembling the electrochemical cell.

Lithium batteries utilizing inert, porous, multi-layered, polymer separator sheets coated, and having the pores of the separator filled with a polymerizable gelling composition which can absorb compounds containing mobile electrolyte-active lithium, are described in U.S. Pat. Nos. 5,837,015 and 5,853,916, issued to Venugopal et al. on Nov. 17, 1998, and Dec. 29, 1998, respectively. It is noted that the above mentioned patents to Venugopal et al. contain only one species of electrolyte-active lithium compound, which is introduced into the assembled battery in the form of an organic, lithium compound bearing solution.

A method of manufacturing a tri-layered battery separator is described in U.S. Pat. No. 5,952,120, issued to Yu et al. on Sep. 14, 1999. Inert, porous polymer separators made of porous layers having different polyethylene and polypropylene blend compositions and hence different mechanical properties, are described in U.S. Pat. No. 5,856,039, issued to Masatoshi Takahashi on Jan. 5, 1999.

There is a need for an electrolyte system for use in thin plate rechargeable lithium batteries which has enhanced mechanical integrity and strength provided by a multi-layered inert, micro-porous separator, as well as capability of high ionic conductivity, without unwarranted increase in the thickness of the electrolyte layer.

SUMMARY OF THE INVENTION

By one aspect of the invention a new composite electrolyte has been found for use in thin plate rechargeable lithium batteries, comprising an inert, first, porous or micro-porous laminate layer of a first polymer, having a first multiplicity of pores including walls, and two major faces, and having an adherent, solid, second layer of a second polymer deposited on at least one of said major faces, and the adherent, solid, second polymer layer is containing a first lithium compound having dissociable lithium ions. The adherent, solid, second polymer layer partially coats one portion of said first multiplicity of pores and the walls of the pores of the inert, first laminate layer of the first polymer, whereby the lithium ion containing, adherent, solid, second polymer is anchored to the inert, first, porous laminate, thereby providing a composite porous, polymer structure of at least two polymer layers, having a second portion of the pores unfilled. The unfilled, second portion of the pores of the composite, porous polymer structure is impregnated with an organic liquid containing a second lithium compound having dissociable lithium ions, and wherein the inert, first, porous laminate layer is comprised of a second multiplicity of sub-layers and at least two sub-layers of the second multiplicity of sub-layers are having different melting temperatures.

By another aspect of the invention the inert, first porous laminate having a first multiplicity of pores including walls, and having a second multiplicity of inert, porous polymer layers, has an adherent, solid, second polymer layer containing a first dissociable lithium compound coating on both major faces. A portion of first multiplicity of the pores or micro-pores, and the walls of the inert, porous, first polymer laminate comprising a second multiplicity of inert, porous polymer sub-layers, is coated and partially filled with the adherent, solid, second polymer, whereby both adherent, solid, second polymer layers containing a first dissociable lithium compound are anchored to the inert, first, porous laminate, thereby providing a composite porous, polymer structure of having a third multiplicity of polymer layers and sub-layers, and having a second portion of the pores unfilled. The composite porous, polymer structure having a third multiplicity of polymer layers and sub-layers, and a second portion of unfilled pores is subsequently impregnated with a second dissociable lithium compound bearing, non-aqueous, organic liquid thereby filling the unfilled portion of the pores. The multi-layered composite polymer structure thereby carries two types of dissociable lithium compounds.

In accordance with a third aspect of the invention there is provided a rechargeable lithium battery comprising:

a positive electode, a negative electrode;

a composite electrolyte comprising an inert, first, porous or micro-porous laminate layer of a first polymer, having a first multiplicity of pores including walls, and two major faces, and having an adherent, solid, second layer of a second polymer deposited on at least one of said major faces, and said adherent, solid, second polymer layer containing a first lithium compound having dissociable lithium ions, said adherent, solid, second polymer layer partially coating one portion of said first multiplicity of pores and the walls of the pores of the inert, first laminate layer of the first polymer, whereby the lithium ion containing, adherent, solid, second polymer is anchored to the inert, first, porous laminate, thereby providing a composite porous, polymer structure of at least two polymer layers, having a second portion of the pores unfilled, said unfilled, second portion of said pores of the composite, porous polymer structure being impregnated with an organic liquid containing a second lithium compound having dissociable lithium ions, and wherein said inert, first, porous laminate layer is comprised of a second multiplicity of sub-layers and at least two sub-layers of the second multiplicity of sub-layers are having different melting temperatures; and current collectors in contact with said positive and said negative electrodes.

The composite electrolyte of the rechargeable lithium battery can have both its major faces coated with an adherent, solid, second polymer layer containing a first lithium compound having dissociable lithium ions.

The thin plate rechargeable lithium battery of the present invention is subsequently packaged and sealed.

Figure 1A:
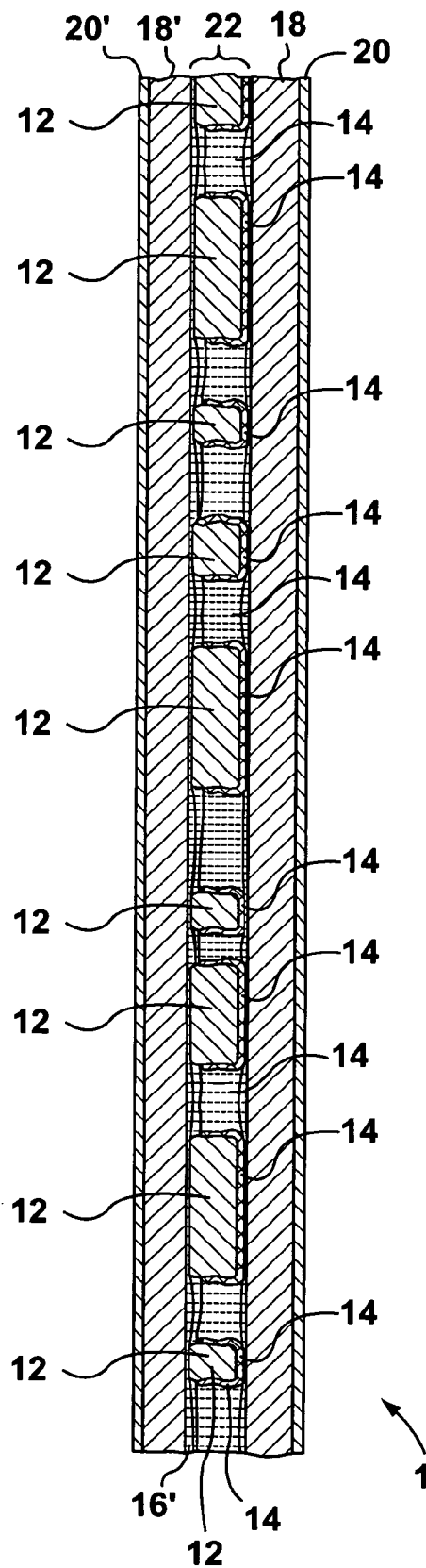
FIGS. 1a and 1b are schematic representations of the layered cross-section of the lithium battery having composite, polymer electrolyte of the present invention.

The preferred embodiments of the invention will be described below, illustrated with working examples.

DETAILED DESCRIPTION OF THE PREFERRED EMBODIMENTS

The current density that a rechargeable lithium battery can generate in operation depends in a large measure, on the mobility of the electro-active species in the electrolyte, and on the concentration of dissociable lithium ions per unit volume in the electrolyte. The mobility of lithium ions in an organic solution is usually higher at a given temperature, than the mobility of lithium ions dissolved or contained in a solid substance. Thin plate rechargeable lithium batteries are frequently packaged in a flexible polymer wrapping which may have minor sealing problems or may be slightly damaged in transit, and thus may inadvertently loose some of the lithium containing fluid. Hence, it is convenient that the amount of lithium containing organic solution is restricted to the amount the separator laminate can readily hold or soak up in its pores and cavities, and as a layer retained on its surfaces. It is customary in conventional lithium batteries to utilize a porous or micro-porous separator laminate in thickness of 10-70 μm to retain in its pores sufficient amount of dissolved electro-active species, as well as to provide mechanical strength. On the other hand, the total concentration of dissociable lithium ions per unit volume may be higher in a solid polymer electrolyte laminate containing lithium, in comparison with the lithium ions in the volume of organic solution the separator laminate is capable of retaining in the pores, etc., however, solid polymer electrolyte laminates frequently have rather low mechanical strength, and as discussed above, need to be of notable thickness for durably separating the battery electrodes from one another, which in turn, may result in increased ionic resistance of the electrolyte layer. It has now been found that the amount of dissociable lithium ions in the electrolyte layer can be increased without increasing the thickness of the electrolyte, and simultaneously providing desirable mechanical strength and integrity, by combining a porous or micro-porous separator laminate with a dissociable lithium ion containing polymer layer or coating on at least one face of the inert, polymer separator laminate, and subsequently impregnating the composite porous electrolyte layer with an organic solution containing a dissociable lithium salt or compound.

The lithium ion containing polymer coating or layer can be deposited on one or on both major faces of the inert, porous polymer separator laminate layer. The porous or micro-porous, inert, polymer separator laminate may be an inert and chemically non-reactive polyalkene-type substance, such as polyethylene, polypropylene, a blended mixture of polyalkenes or similar inert organic polymers, frequently utilized in conventional rechargeable lithium batteries. The expression 'separator laminate' is understood to describe a sheet-like, inert, i.e. chemically non-interacting with the lithium battery components, relatively thin substance, having pores or channels which allow a liquid or semi-liquid to connect opposing faces of the separator laminate with one another. For the sake of clarity, the polymer substance utilized in the manufacture of the separator laminate will be referred to in subsequent discussions below as the first polymer.

The porous or micro-porous inert, first polymer separator laminate may be single or multi-layered. The inert, porous separator laminate, made of a single or several porous polymer layers, is coated by known methods with another organic solid polymer layer, containing a lithium compound which has dissociable or labile lithium ions. Such organic polymers are often referred to as solid polymer electrolytes. In the preferred embodiment the deposited coating is relatively thin; this can be achieved by providing the coating as a relatively dilute solution, so that after evaporation of the solvent another layer of the coating is left on the exposed surfaces of the first polymer separator, that is, on the two sides of a sheet-form separator and on the walls of its pores. Thus, in addition to coating the outer major sides or surface, the lithium containing second polymer can flow into and coat part of the walls of at least some of the pores, and hence, provide partial filling of the pores of the inert, first polymer separator laminate. The deposited second polymer coating is thereby not only adhering to the surface, but is anchored to the separator by partially filling some of the pores of the separator laminate by means of coating the pore-walls. It should be understood that by partially coating the walls of the pores on the face of the inert, porous first polymer laminate, the second polymer layer containing a dissociable lithium compound, itself becomes porous. It is, however, noted that the inert, porous separator laminate, referred to as first polymer laminate, having the porous lithium ion containing, solid, second polymer coating or layer on one or both of its faces, retains sufficient porosity for subsequent impregnation with another lithium salt containing, organic liquid. The deposited solid, second polymer layer may be composed of polyethylene oxide, polypropylene oxide, polyvinylidene fluoride or poly-methyl methacrylate, and the lithium compound dissolved in the second polymer may be, lithium triflate ($LiCF_3SO_3$), lithium borohexafluoride ($LiBF_6$), lithium phosphohexafluoride ($LiPF_6$), lithium arsenofluoride ($LiAsF_6$), lithium perchlorate ($LiClO_4$) or any known lithium compound which is soluble in the deposited polymer, and contains a lithium ion which is capable of dissociating.

The dissociable lithium compound containing, solid, second polymer coating or layer may be obtained, for example, by depositing a relatively dilute polymer suspension on the face of the inert, porous separator laminate, and allowing to evaporate, or removing by drying the medium in which the lithium compound containing polymer has been suspended. Other methods for obtaining a lithium ion containing, solid, second polymer coating include electrophoresis, vapour deposition, immersion of the separator sheet in a relatively dilute emulsion of a lithium compound containing polymer, and another non-aqueous liquid which has a relatively low boiling point. The solvent component of the emulsion may be removed by drying or vacuum. The emulsion or suspension may also be painted or sprayed onto the surface of the porous or micro-porous separator laminate.

Yet another method by which a lithium ion containing, solid coating or layer can be obtained on one or both faces of the porous or micro-porous, inert, first polymer separator laminate, is to admix a binder-soluble lithium compound with the conventional electrode binder compound. A known binder is, for example, polyvinylidene fluoride (PVDF), frequently utilized in forming electrode layers. The electrode and the inert, porous separator laminate are subsequently assembled in the usual manner, and conventionally heat-compression treated at a temperature which is sufficiently above the softening and flowing point of the binder, but at least a 20 degree range below the melting point of the inert, porous first polymer separator laminate. (The temperature differences throughout the specification and in the claims are measured in centigrade.) The convenient temperature range for the heat-compression treatment, as a skilled technician would know, is between 50-90° C. A portion of the binder mixed with the electrode material will be squeezed out as a consequence of the treatment, and flow between the electrode and the inert, porous, first polymer separator laminate, thereby forming a solid, lithium ion containing, second polymer coating layer and also coating the walls of some of the pores of the inert, porous, multi-layered separator laminate. This method of obtaining a lithium ion containing second polymer coating on the inert, porous, multi-layered, first polymer separator laminate of a lithium electrochemical cell will be referred to in subsequent discussions as heat-compression coating.

Any of the above coating methods or conventional methods similar to those, can be utilized for obtaining a labile lithium containing, second polymer coating anchored to the surface of an inert, porous separator laminate made of a single polyalkene layer, or having multiple sub-layers of different polyalkene compositions. As discussed above, the coating partially fills by means of coating the walls of some of the pores of the inert, porous or micro-porous first polymer separator laminate.

The inert, porous, first polymer separator laminate with an adhering, solid, lithium ion containing, second polymer layer is subsequently impregnated with an organic liquid in which a lithium salt has been dissolved. The lithium salt in the adherent, porous, second polymer layer may be different from the lithium salt dissolved in the organic liquid, however, the lithium compounds may also be the same, dictated by convenience only. Any lithium salt that is soluble in the organic liquid conventionally utilized in impregnating inert, porous polymer separators or composite polymer laminates, may be used, such as for example, lithium perchlorate, lithium phosphohexafluoride, lithium borohexafluoride, lithium triflate, lithium arsenofluoride and chemical equivalents. The organic liquid for dissolving the lithium salt may be ethylene carbonate, propylene carbonate, di-methyl carbonate, di-ethyl carbonate, ethyl-methyl carbonate and similar conventional, non-aqueous solvent-type substance capable of dissolving dissociable lithium containing compounds. The organic solvent may be a mixture of any of the above listed substances. The usual concentration of the lithium salt in the organic solvent ranges between 0.5 to 1.5 mole.

The three-component composite electrolyte, comprising an inert, porous or micro-porous, first polymer composed of single or multiple, polyalkane-type, polymer sub-layers, an adherent coating of a solid, mobile lithium ion containing, second polymer, and a lithium ion containing organic liquid in the pores of the polymers, is subsequently inserted between positive and negative electrodes of a lithium battery. Such electrodes usually contain lithium electrode active materials capable of reversibly intercalating lithium ions, or may also include elemental lithium or a lithium alloy foil. One face of each of the battery electrodes is usually in contact with a positive and negative current collector, respectively. The cross-section of the assembled lithium battery or cell is schematically shown on FIG. 1a, where 10 represents the battery, 12 is the inert, porous separator laminate, and 14 is the deposited solid, layer of dissociable lithium compound containing second polymer adhering to and partially filling the pores of the inert, separator laminate. The double layer structure, 12 and 14, is impregnated with a lithium salt containing organic liquid, filling the unfilled portion of the pores and micropores, as well as forming thin films on the surfaces of the combined layer structure, schematically indicated by reference numerals 16 and 16'. The composite electrolyte is shown by reference numeral 22. 18 and 18' represent the lithium battery electrode layers, and 20 and 20' are the respective current collectors. The assembled lithium battery is subsequently packaged in flexible polymer sheets and sealed in the usual manner to protect the lithium battery from mechanical damage and atmospheric corrosion.

Figure 1B:
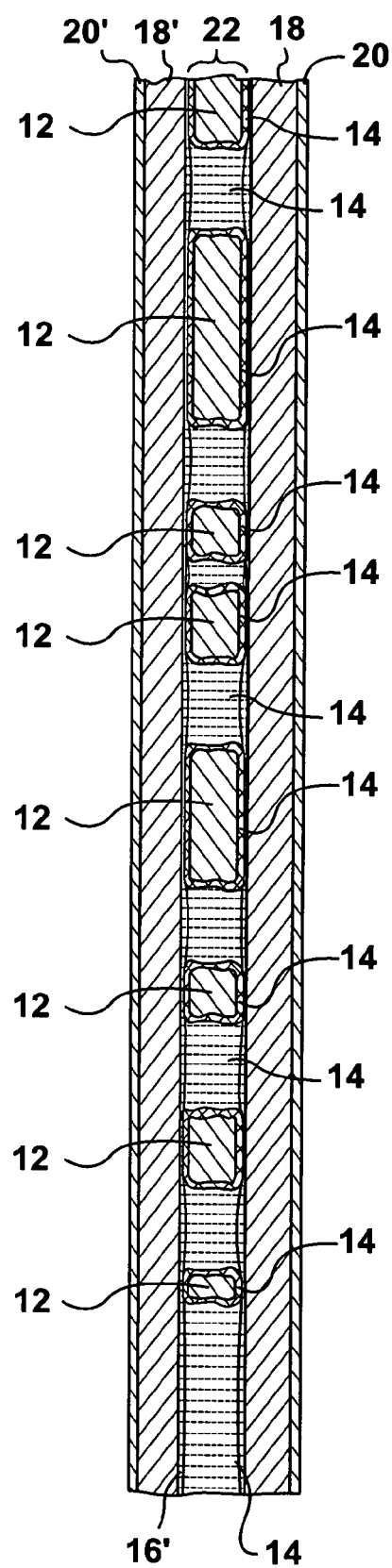

FIG. 1b shows another embodiment, wherein each face of the porous separator laminate 12, carries a porous layer of dissociable lithium compound containing polymer, 14 and 14'. Like numerals represent like elements of FIG. 1a.

Figure 2A:
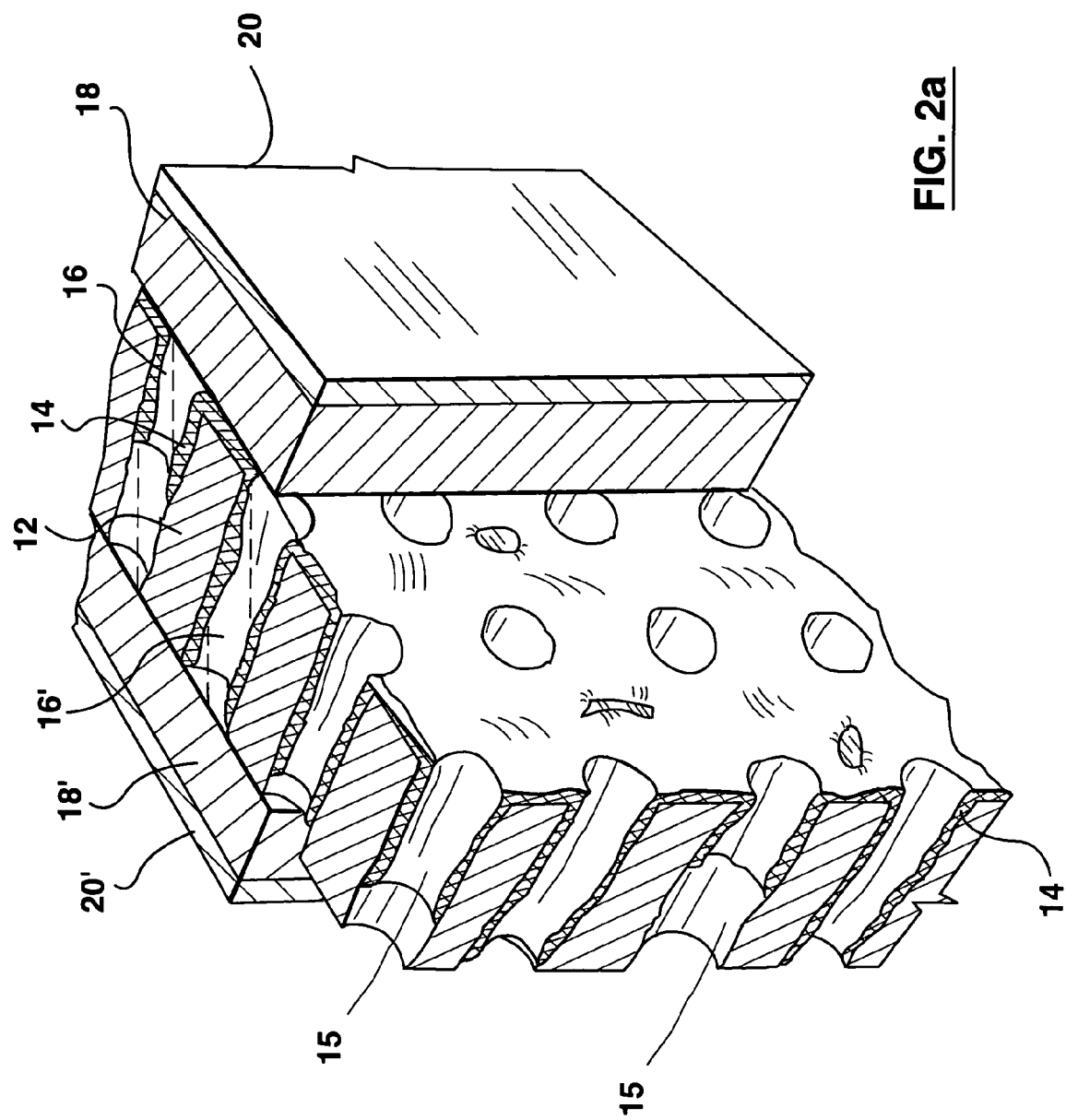
FIGS. 2a and 2b are perspective, cut-away representations of the lithium battery, having a composite polymer electrolyte of the present invention, corresponding to FIGS. 1a and 1b, respectively.
Figure 2B:
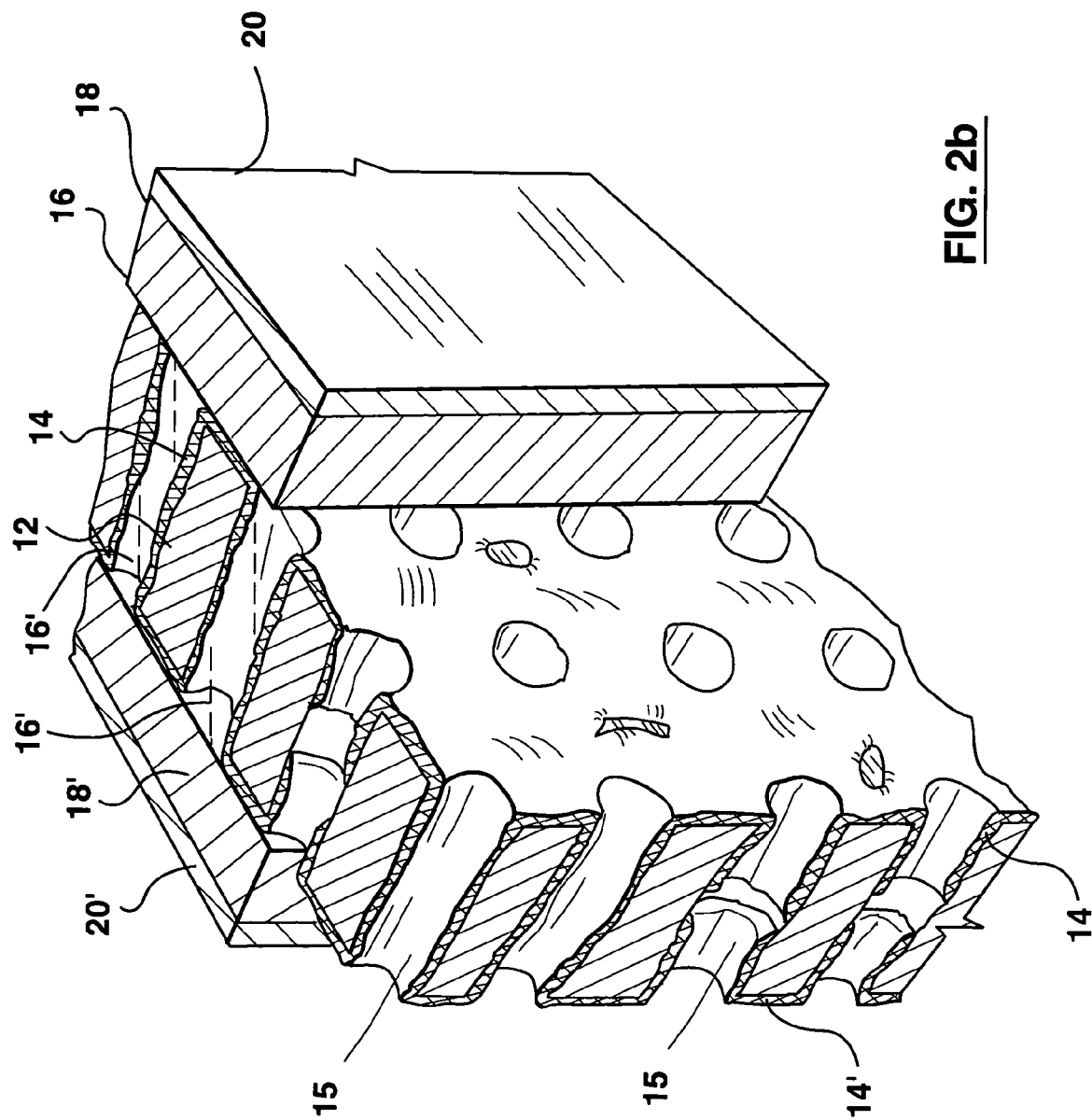

FIGS. 2a and 2b show in further detail the lithium electrochemical cell structure of FIGS. 1a and 1b. As discussed above, the separator of the present invention preferably comprises an inert, porous or micro-porous polymer laminate 12, on at least one face of which another solid polymer layer 14, has been coated or deposited, the second solid polymer layer containing a dissociable lithium compound. Coating or deposition of a thin layer of the second polymer is conveniently achieved by dipping into, or painting the face of the inert, porous, separator laminate with a dilute solution or suspension of the desired polymer containing a dissociable lithium compound, or depositing a lithium ion containing, thin polymer layer by any other known means. The separator laminate 12, is allowed to dry or the solvent carrying the second polymer is allowed to evaporate. This has the effect of leaving a solid polymer coating 14, bearing a dissociable lithium compound, on the exposed surface of the inert, porous polymer separator laminate 12. The deposited coating then not only adheres to the surface of the inert, porous separator laminate 12, but may also partially flow into some of the pores of laminate 12. FIG. 2a indicates that only one face of the separator laminate 12 has second polymer coating 14, and FIG. 2b shows both major faces of the porous separator laminate carrying solid second polymer coatings, 14 and 14'. As FIGS. 2a and 2b show, the exposed surfaces here are not just the two major faces defining the inert polymer separator laminate, but also include some of the wall surfaces of the individual pores indicated by reference numeral 15, extending through the inert laminate. Moreover, since the solids are present in the depositing solution in a low concentration, the amount of the second polymer adhering to the inert, porous polymer separator is small. While substantial portion of the internal surface of the pores may be coated, the pores themselves will not be completely filled, nor are such pores completely closed off, so that as discussed above, the remaining portion of pores 15, can be completely filled with a desired lithium salt containing organic solution 16. Electrodes 18 and 18' respectively, are in contact with one face each of the inert, porous polymer separator laminate. There is likely to be a very thin layer of lithium salt containing organic liquid between the electrodes and the inert, porous polymer separator, which is not shown. Current collectors 20 and 20' are located on the external surfaces of electrodes 18 and 18'.

It will be understood here, that with reference to coating of the inert polymer separator laminate and coating of walls of the pores, such processes are carried out on a microscopic scale, and necessarily, at the microscopic level, cannot be controlled with any precision. Thus, the degree of coating will necessarily vary, to at least some extent amongst the pores, and the extent to which individual pores are filled can vary. It will also be understood that, as shown in FIGS. 2a, 2b, 4a and 4b, the nature of the porous separator laminate is such that it is not always possible to clearly distinguish between discrete pores and portions of the laminate without pores. Consequently, references to "a substantial portion", or percentages of the pores, are averaged amounts, indicating that, on average basis, the pores are coated or filled as indicated.

It is known to utilize inert, porous, multi-layered polyalkane-type separators in rechargeable lithium batteries, it is also known that the porous, polymer layers comprised in the multi-layered polymer separator have different polyalkane composition, then, the layers have different melting points. The polymer sub-layers may be made of polyethylene of different average molecular weight and chain lengths, or blended mixtures of polyethylene and polypropylene, and similar known variations in the composition of polyalkenes utilized in making inert, porous polymer laminates. It is not unusual that a lithium electrochemical cell becomes damaged, or the ionic path between electrodes has become shortened, or due to some similar circumstance, the current density in a small area is increased, thus leading to local overheating of the cell. In such instance, a polymer sub-layer within the multi-layered separator having at least 20-C lower melting temperature than the other polymer sub-layers, can isolate the problem area. An example of a suitable multi-layer separator is found in U.S. Pat. No. 4,650,730 by Lundquist et al., which is hereby incorporated by reference. Furthermore, in a battery system composed of several lithium electrochemical cells connected in series and in parallel, an electrochemical cell which has become overheated can be isolated, and removed or/and replaced without disabling the entire battery circuit or system. Thus having an inert, porous or micro-porous, multi-layered polymer separator wherein one of the polymer layers has at least 20-C lower melting point may be regarded as a method to prolong the useful life of lithium battery circuit.

In a further embodiment of the present invention the inert, porous polymer separator laminate comprises at least three layers of porous or micro-porous polymer sub-layers of at least two different polyalkane compositions. One of the sub-layers is made of a polyalkane composition which preferably has melting point at least 20-lower than the composition of the other sub-layers. The inert, porous polymer sub-layer having lower melting point, is preferably sandwiched between the other inert, porous polyalkane sub-layers. Such arrangement is shown on FIGS. 3a and 3b and FIGS. 4a and 4b. In this second embodiment, where components are given the same reference numeral as in FIGS. 1 and 2, and for simplicity and brevity, the description of these components is not repeated. Principally, the laminate 12 is replaced by multi-layer or sub-layered laminate 24.

Figure 3A:
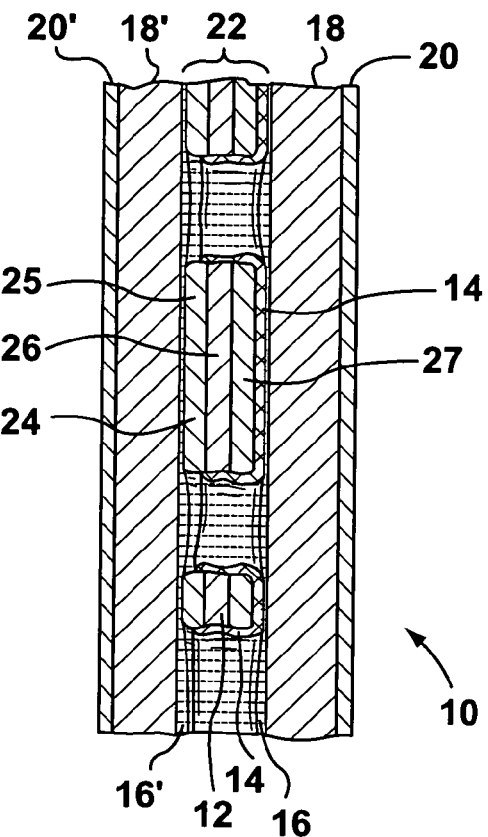
FIGS. 3a and 3b are schematic representations of the lithium battery, having a multi-layered, composite polymer electrolyte of the present invention, corresponding to FIGS. 1a and 1b, respectively.
Figure 3B:
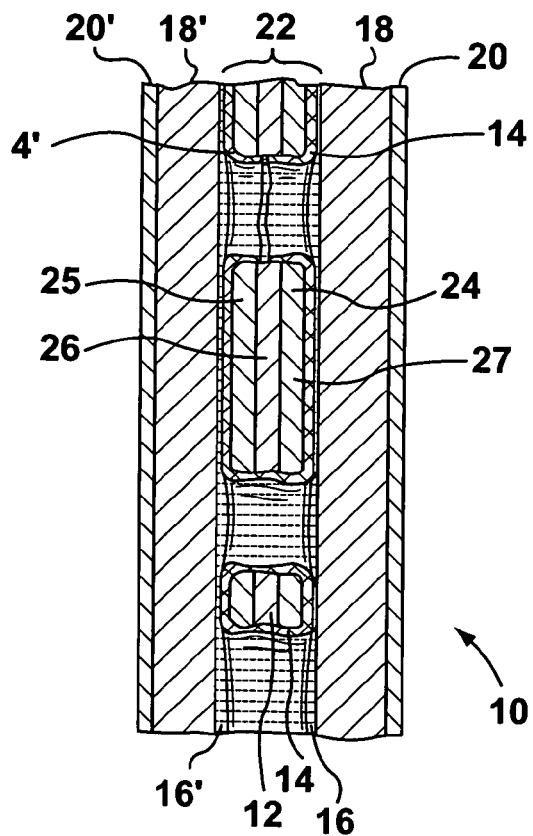

The inert, porous polymer separator laminate in FIGS. 3a and 3b is denoted by reference numeral 24, and is made up of three porous sub-layers 25, 26, and 27. It is noted that the preferred total thickness of the inert, multi-layered, porous separator laminate is less than 100_m, and that the pores in each sub-layer do not necessarily overlap. Thus, it is possible for the multi-layer laminate to be formed of two or three sub-layers, each formed separately, and which are then provided together, either by simply placing them together or by laminating them together. However, a preferred structure has the sub-layers integrally laminated together as a single sheet, without pores, and then has the pores formed in the laminated sheet, such a structure is found in the "Celgard 2300" laminate detailed below.

The middle sub-layer 26 preferably has a lower melting point than the other two porous polymer sub-layers. The other two porous polymer sub-layers may have the same composition, or may have different compositions, however, the sub-layers 25 and 27 have melting temperature above that of the middle sub-layer 26. The lithium compound bearing, second solid polymer is deposited or coated on the face or faces of the inert, porous, multi-layer polymer separator laminate in the same manner as described above, partially filling or coating the walls of the pores of the individual polymer sub-layers. The coating 14 and 14' of the lithium compound containing, second solid polymer of the inert, porous, multi-layer, separator laminate 24, having multiple layers 32, 34 and 36, are shown on FIGS. 3a and 3b.

Figure 4A:
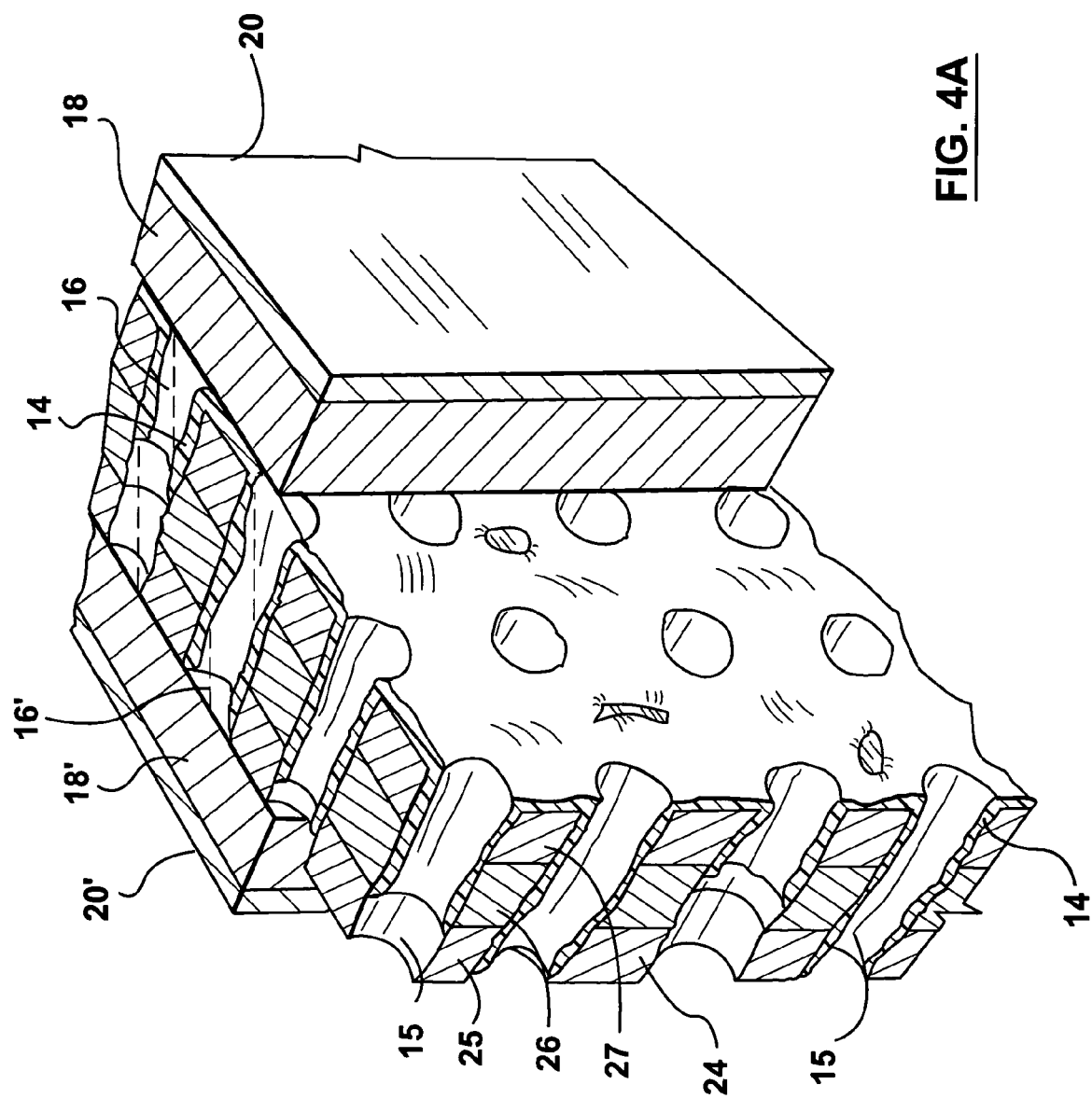
FIGS. 4a and 4b are perspective, cut-away representations of the lithium battery, having a composite polymer electrolyte of the present invention, corresponding to FIGS. 3a and 3b, respectively.
Figure 4B:
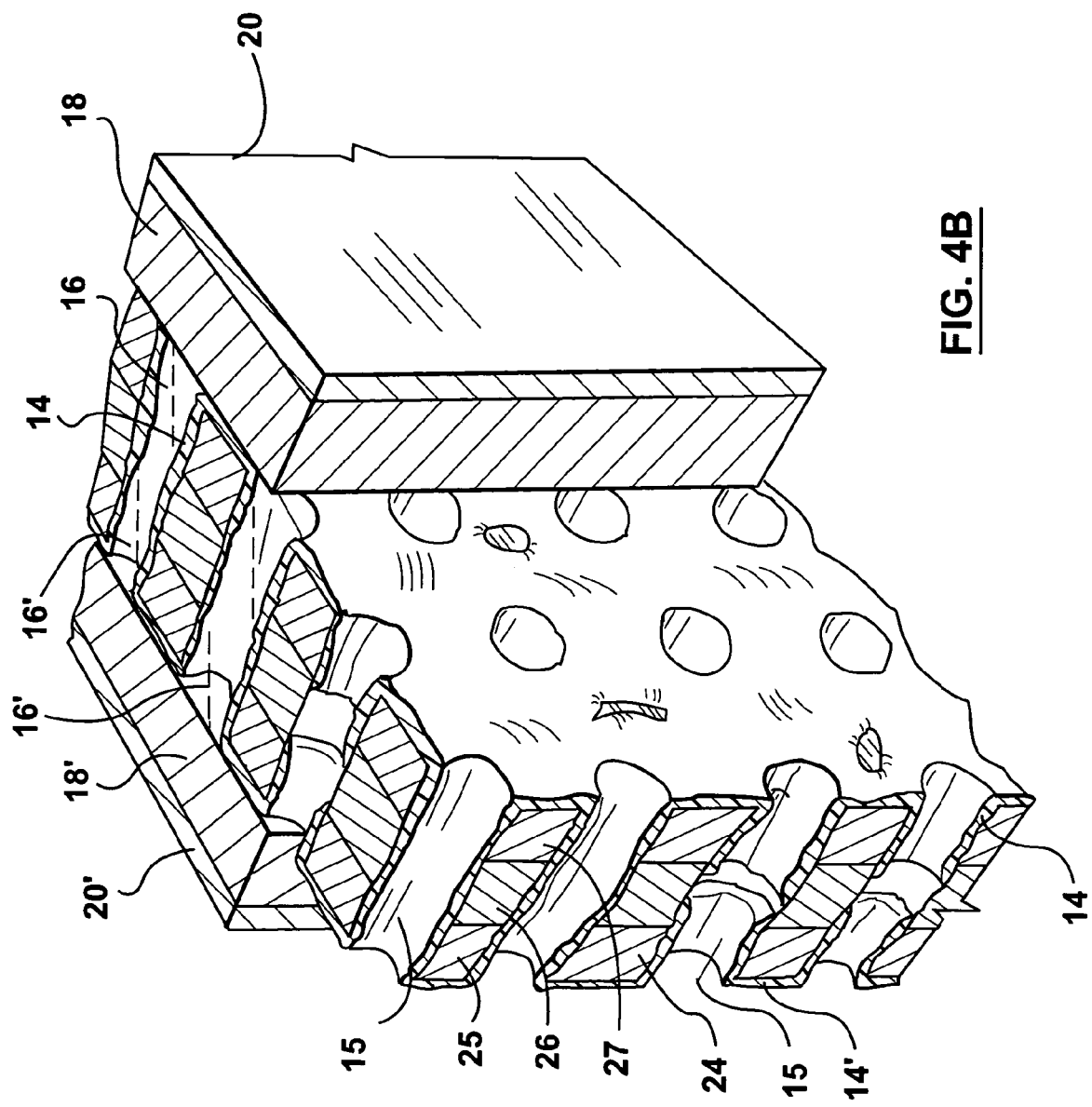

FIGS. 4a and 4b show schematic sectional views of the multi-layer separator 24, in a representation similar to that of FIGS. 2a and 2b. The multiple layers are indicated by reference numerals 25, 26 and 27.

In yet another embodiment the two-polymer bearing, composite solid polymer structure, according to either embodiment of FIGS. 1 and 2, or the embodiment of FIGS. 3 and 4, made of the inert, porous first polymer separator laminate and the adherent, dissociable lithium compound bearing, solid, second polymer electrolyte layer is first inserted between the positive and negative electrodes of the rechargeable lithium electrochemical cell, and subsequently, the obtained composite, porous, solid polymer electrolyte-electrode structure is impregnated with the dissociable lithium compound containing organic liquid electrolyte in the usual manner. The lithium battery so obtained is then packaged and sealed. Thus the composite polymer layers of the present invention may be impregnated with the lithium ion containing organic solution either prior to assembling the lithium cell or subsequent to bringing the electrodes in contact with the composite electrolyte structure, but at any rate, prior to packaging and sealing the battery.

The examples below illustrate the working of the invention.

EXAMPLE 1

A rechargeable lithium battery was assembled having positive electrode layer made of lithium-cobalt oxide of 20 μm particle size, mixed with 5 wt. % acetylene black and 5 wt. % polyvinylidene fluoride (PVDF) as binder. The negative electrode layer of the lithium battery was made of graphite of 15 μm particle size, mixed with 5 wt. % PVDF binder. The electrolyte consisted of a microporous polyethylene and polypropylene multi-layered polymer laminate marketed under the name of "Celgard 2300" by Celgard Inc. of Charlotte, N.C. (Celgard is a Registered Trademark of the Hoechst Celanese Corporation), which has been dipped in a suspension of submicroscopic polyethylene oxide particles containing lithium phosphohexafluoride ($LiPF_6$) in the range of 5-8 wt. %. The polyethylene oxide was suspended in a 1:1 mixture of acetone and n-methylpyrrolidone (NMP), and the resulting suspension contained 30 wt. % solids. The suspension coating on the polymer laminate was allowed to dry. The dried polyethylene oxide layer filled 15% of the volume of the pores of the "Celgard 2300" layer. The obtained composite porous polymer layer structure was placed between the $LiCoO_2$ positive electrode and the graphite negative electrode and subsequently impregnated with an ethylene carbonate-di-methyl carbonate solution containing $LiPF_6$ in 1 mole concentration. The obtained lithium battery was packaged and sealed. The active surface area of the lithium battery was 600 cm$^2$.

The lithium battery was cycled between 4.2 volt and 3.0 volt, charging at 400 mA and discharging at 400 mA. The voltage drop of the lithium battery at 400 mA current was measured to be 40 mV, which yielding a value of calculated electrolyte resistance of 60 ohm.cm. The capacity of the lithium battery was 3200 mAh, which was found to diminish slightly after 50 "cycling"; the term "cycling" is used accordingly in this specification, including the claims.

EXAMPLE 2

A lithium battery was made up of positive and negative electrodes as described in Example 1. The electrolyte was constructed of microporous polypropylene laminate marketed under the name of "Celgard 2500". The polypropylene layer was dipped in an organic liquid containing 1 wt. % of PVDF submicroscopic particles in a 1:1 mixture of acetone and NMP. The polypropylene was withdrawn from the suspension and the solvent was allowed to evaporate to yield a continuous coating. The PVDF contained 8-10 wt. % LiPF$_6$. The dipping of the "Celgard 2500" laminate was repeated 6 times, thereby building up a layer of PVDF containing LiPF$_6$. About 35% of the volume of pores of the "Celgard 2500" laminate were penetrated by the LiPF$_6$ containing PVDF layer. The obtained composite porous polymer structure was placed between the LiCoO$_2$ positive electrode and the graphite negative electrode and subsequently impregnated with an ethylene carbonate-methyl-ethyl carbonate solution containing LiPF$_6$ in 1 mole concentration. The obtained lithium battery was packaged and sealed. The active surface area of the lithium battery was 600 cm$^2$.

The lithium battery was cycled between 4.2 V and 2.75 V, charging at 400 mA and discharging at 400 mA. The voltage drop of the lithium battery at 400 mA current was measured to be 63 mV, thus the electrolyte resistance was calculated to be 94.5 ohm.cm. The capacity of the lithium battery was 3150 mA/h which was found to diminish slightly after 60 cycling.

EXAMPLE 3

A lithium battery was made up of positive and negative electrodes as described in Example 1, however, the binder utilized in the electrodes of the lithium battery was 5 wt. % PTFE. The electrolyte was constructed of microporous polypropylene layer marketed under the name of "Celgard 2500". The polypropylene layer was coated by the doctor's blade method on both sides, in turn, with a suspension of submicroscopic PTFE in an organic liquid comprising a 1:1 mixture of acetone and NMP. The PTFE contained 6 wt. % LiPF$_6$. The solid content of the suspension was 20 wt. %. The PTFE coating was subsequently dried. It was found that 20% of the volume of the pores of the "Celgard 2500" laminate was coated by the LiPF$_6$ containing PTFE layer. The porous polymer structure was impregnated with an ethylene carbonate-methyl-ethyl carbonate solution containing LiPF$_6$ in 1 mole concentration, and subsequently placed between a LiCoO$_2$ positive electrode and a graphite negative electrode made as described in Example 1. The obtained lithium battery was packaged and sealed. The active surface area of the lithium battery was 600 cm$^2$.

The lithium battery was cycled between 4.2 V and 2.95 V, charging at 400 mA and discharging at 400 mA. The voltage drop of the lithium battery at 400 mA current was 55 mV, which gave a calculated electrolyte resistance of 82.5 ohm.cm. The capacity of the lithium battery was 3180 mA/h, which value was found to diminish slightly after 50 cycling.

EXAMPLE 4

A rechargeable lithium battery was assembled having positive electrode layer made of lithium-cobalt oxide of 20 μm particle size, mixed with 5 wt. % acetylene black and 7 wt. % polyvinylidene fluoride (PVDF) binder containing LiClO$_4$ at 10 wt. % per PVDF binder weight. The negative electrode layer of the lithium battery was made of graphite of 15 μm particle size, mixed with 7 wt. % PVDF binder which was further admixed with LiClO$_4$ at 10 wt. % per PVDF binder weight. The separator was comprised of a micro-porous polyethylene and polypropylene multi-layer polymer laminate, marketed under the name of "Celgard 2300", which has two sub-layers of polypropylene and a central sub-layer of polyethylene, the central sub-layer having melting temperature of 125° C. The multi-layer laminate was then assembled with the electrode layers, such that one electrode was in contact with each face, and the three layered assembly was heated and gently compressed at a temperature around 80° C. for a few minutes. A thin, continuous, porous layer of polyvinylidene fluoride containing lithium perchlorate (LiClO$_4$) in 10 wt. %, was thus formed between the electrodes and each face of the "Celgard 2300" separator layer when the assembly was allowed to cool. The lithium ion containing polyvinylidene fluoride also coated the walls of some of the pores of the "Celgard 2300" polymer separator. The obtained electrodes and composite porous polymer layer structure sandwiched between them, was subsequently impregnated with an ethylene carbonate-di-methyl carbonate solution containing LiPF$_6$ in 1 mole concentration. The obtained lithium battery was packaged and sealed. The active surface area of the lithium battery was 1700 cm$^2$.

The lithium battery was cycled between 4.2 volt and 3.0 volt, charging at 2000 mA and discharging at 2000 mA. The voltage drop of the lithium battery at 2000 mA current was measured to be 70 mV, resulting in cell resistance of 60 ohm.cm. The capacity of the lithium battery was 11000 mAh, which was found to diminish slightly after 50 cycling.

EXAMPLE 5

A lithium battery was made up of positive and negative electrodes as described in Example 1. The electrolyte was constructed of microporous multi-layer polypropylene-polyethylene laminate marketed under the name of "Celgard 2300" and described in Examples 1 and 4. The multi-layer laminate layer was coated on each of its external faces by known methods with an organic liquid containing 1 wt. % of PVDF submicroscopic particles in a 1:1 mixture of acetone and NMP and 8 wt. % LiPF$_6$. The solvent in the lithium containing polymer coating carried on the multi-layer polymer laminate was allowed to evaporate to yield a continuous, porous coating on the faces and the walls of some of the pores of the sub-layers. The coating of the multi-layer "Celgard 2300" laminate was repeated 3 times, thereby building up a solid layer of PVDF containing LiPF$_6$. About 30% of the volume of the pores of the "Celgard 2300" laminate were coated by the LiPF$_6$ containing PVDF layer, resulting in 20 wt. % weight increase of the laminate. The obtained composite porous, polymeric structure was placed between the LiCoO$_2$ positive electrode and the graphite negative electrode and subsequently impregnated with an ethylene carbonate-methyl-ethyl carbonate solution containing LiPF$_6$ in 1 mole concentration. The obtained lithium battery was packaged and sealed. The active surface area of the lithium battery was 600 cm$^2$.

The lithium battery was cycled between 4.2 V and 2.75 V, charging at 600 mA and discharging at 600 mA. The voltage drop of the lithium battery at 600 mA current was measured to be 63 mV, thus the electrolyte resistance was calculated to be 94.5 ohm. The capacity of the lithium battery was 3150 mAh, which was found to diminish slightly after 55 cycling.

The lithium salt in the above described lithium batteries assembled in accordance with the present invention was lithium phosphohexafluoride, but other lithium compounds, such as lithium perchlorate, lithium arsenofluoride, lithium triflate, lithium borohexafluoride or other lithium salts soluble in organic substances could equally well have been used.

The particular advantages of the composite electrolyte of the present invention is that the porous polymer layers comprised in the inert, porous multi-layer or sub-layered laminate have different melting points and may have different thickness of individual layers, however, the layers reinforce each other and occupy relatively low total volume of the battery. The dissociable lithium compound containing, solid second polymer layer coating a major face or faces of the inert, porous, multi-layer separator laminate will provide one source of mobile lithium ions, and the lithium ion containing organic solution impregnating the composite porous polymer structure provides another source of mobile lithium ions, thereby increasing the population of electro-active species without notably increasing the volume of the planar lithium electrochemical cells. Another advantage is that the porous or micro-porous, inert, multi-layer separator laminate not only provides support for the solid and liquid electrolytes present but also renders a means of isolation of a local area of a cell, or of a faulty cell in case of stacked lithium electrochemical cells, should overheating of the cell occur.

Although the present invention has been described with reference to the preferred embodiment, it is to be understood that modifications and variations may be resorted to without departing from the spirit and scope of the invention, as those skilled in the art will readily understand. Such modification and variations are considered to be within the purview and scope of the invention and the appended claims.

We claim:

1. A composite electrolyte for a rechargeable lithium battery comprising:
    an inert, first, porous, laminate layer of a first polymer, having a first multiplicity of pores including walls, and two major faces, and having an adherent, solid, second layer of a second polymer deposited on at least one of said major faces, said adherent, solid, second polymer layer containing a first lithium compound having dissociable lithium ions, wherein said adherent, solid, second polymer layer partially fills one portion of said first multiplicity of pores of said inert, first, porous laminate layer, thereby providing a composite, porous, polymer structure of at least two polymer layers, having a second portion of said first multiplicity of pores unfilled, and wherein said unfilled second portion of said pores of said composite, porous, polymer structure is impregnated with an organic liquid containing a second lithium compound having dissociable lithium ions, and wherein said inert, first, porous laminate layer is comprised of a second multiplicity of porous sub-layers, and at least two of said second multiplicity of porous sub-layers have different melting temperatures.

2. A composite electrolyte for a rechargeable lithium battery as claimed in claim 1, wherein said inert, first, porous laminate layer comprises within said second multiplicity of porous sub-layers, one porous sub-layer sandwiched between at least two other sub-layers, said one sandwiched porous sub-layer having a significantly lower melting temperature than the other sub-layers.

3. A composite electrolyte for a rechargeable lithium battery as claimed in claim 1 or 2, wherein said first polymer of said inert, first, porous laminate layer is chemically different from said adherent, solid, second polymer deposited on at least one of said major faces of said inert, first, porous laminate layer.

4. A composite electrolyte for a rechargeable lithium battery as claimed in claim 1 or 2, wherein each porous sub-layer of the second multiplicity of sub-layers comprised in said inert, first, porous laminate layer, is made of a polymeric compound selected from the group consisting of polyethylene, polypropylene, another long chained polyalkene, and a blended mixture of polyalkenes.

5. A composite electrolyte for a rechargeable lithium battery as claimed in claim 2, wherein said one sandwiched porous sub-layer in said second multiplicity of sub-layers comprised in said inert, first, porous laminate layer is made of a polymeric compound having melting temperature at least 20° C. below the melting temperature of the polymeric compounds of each of said other porous sub-layers of said second multiplicity of porous sub-layers.

6. A composite electrolyte for a rechargeable lithium battery as claimed in claim 1, wherein said solid, second polymer is selected from the group consisting of polyethylene oxide, polytetrafluoroethylene (PTFE), and polyvinylidene fluoride copolymer.

7. A composite electrolyte for a rechargeable lithium battery as claimed in claim 1, wherein said first lithium compound having dissociable lithium ions is selected from the group consisting of lithium triflate, lithium borohexafluoride, lithium phosphohexafluoride, lithium arsenofluoride and lithium perchlorate.

8. A composite electrolyte for a rechargeable lithium battery as claimed in claim 1, wherein said second lithium compound having dissociable lithium ions dissolved in said organic liquid, is selected from the group consisting of lithium triflate, lithium borohexafluoride, lithium phosphohexafluoride, lithium arsenofluoride and lithium perchlorate.

9. A composite electrolyte for a rechargeable lithium battery as claimed in claim 1, wherein said organic liquid is selected from the group consisting of ethylene carbonate, di-methyl carbonate, di-ethyl carbonate, methyl-ethyl carbonate, propylene carbonate, and mixtures thereof.

10. A composite electrolyte for a rechargeable lithium battery as claimed in claim 1, wherein said first lithium compound having dissociable lithium ions is the same as said second lithium compound.

11. A composite electrolyte for a rechargeable lithium battery as claimed in claim 6, wherein said adherent, solid, second polymer layer is deposited on at least one of the major faces of said inert, first, porous laminate layer, and said deposited adherent second polymer layer partially fills one portion of said first multiplicity of pores, by one of the methods selected from the group: electrophoresis, vapour deposition, coating of a suspension of said second polymer, heat-compression coating with a lithium compound containing binder compound, and immersion of said inert, first, porous laminate layer comprised of said second multiplicity of sub-layers of said first polymer, in an emulsion of said second polymer.

12. A composite electrolyte for a rechargeable lithium battery as claimed in claim 1, wherein said first multiplicity of pores of said inert, first, porous laminate layer is partially filled by at least partially coating said walls of said first multiplicity of pores with said adherent, solid, second layer of the second polymer.

13. A composite electrolyte for a rechargeable lithium battery as claimed in claim 1, wherein said composite, porous, polymer structure is formed of a third multiplicity of polymer layers and sub-layers, and wherein the first and last layers thereof are adherent, solid, layers of said second polymer deposited on said major faces of said inert, first, porous laminate layer comprised of said second multiplicity of porous sub-layers.

\* \* \* \* \*